United States Patent [19]

Inada

[11] Patent Number: 5,279,177
[45] Date of Patent: Jan. 18, 1994

[54] WRIST MECHANISM OF INDUSTRIAL ROBOT

[75] Inventor: Takahiro Inada, Kakogawa, Japan

[73] Assignee: Kawasaki Jukogyo Kabushiki Kaisha, Hyogo, Japan

[21] Appl. No.: 942,196

[22] Filed: Sep. 9, 1992

[30] Foreign Application Priority Data

Sep. 30, 1991 [JP] Japan .................. 3-079340[U]

[51] Int. Cl.⁵ ............................................. B25J 17/02
[52] U.S. Cl. .................................. 74/479 BW; 901/26; 901/29
[58] Field of Search ............... 74/479 BW; 901/26, 29

[56] References Cited

U.S. PATENT DOCUMENTS

| | | | |
|---|---|---|---|
| 4,642,021 | 2/1987 | Kikuchi | 901/26 X |
| 4,708,580 | 11/1987 | Akeel | 74/417 |

FOREIGN PATENT DOCUMENTS

| | | | |
|---|---|---|---|
| 240438 | 10/1987 | European Pat. Off. | 901/26 |
| 0299083 | 1/1989 | European Pat. Off. | |
| 0443576 | 8/1991 | European Pat. Off. | |
| 8428041 | 10/1985 | Fed. Rep. of Germany | |
| 2-65989 | 3/1990 | Japan | |

*Primary Examiner*—Allan D. Herrmann
*Attorney, Agent, or Firm*—Oliff & Berridge

[57] ABSTRACT

A wrist mechanism mounted on an arm of a robot has a wrist flange to which a spray gun is mounted. Coaxially with the arm are provided concentric and relatively rotatable cylinders. From the outermost cylinder extends forward a housing in which gears and shafts are enclosed and operate as follows. Rotations of second and third inner cylinders are transmitted via spur gear trains to respective power transmission shafts extending in parallel to the axis of the cylinders. Bevel gears fixed to respective far ends of the transmission shafts mesh with other bevel gears which have a second axis transverse to the axis of the cylinders. A cylindrical member fixed to one of the other bevel gears is therefore swingable about the second axis. Rotation of the other bevel gear is transmitted to a further gear to rotate the spray gun. A cover besides the housing has an opening through which a flexible paint-supply hose is led into the mechanism to be connected to the spray gun. This serves to reduce the length of the hose from a paint color changeover valve and hence shorten the rinsing time of the hose. The second axis enables the spray gun to swing therearound, thereby eliminating a dead space to which the spray gun cannot have access.

13 Claims, 6 Drawing Sheets

WRIST MECHANISM OF INDUSTRIAL ROBOT

BACKGROUND OF THE INVENTION

This invention relates to a wrist mechanism of an industrial robot, and more particularly to a wrist mechanism for holding a paint spray gun or a work tool thereon, an elongated member such as a hose or a bundle of wires being passed through the mechanism.

U.S. Pat. No. 4,708,580 to Akeel discloses a wrist mechanism of a robot having three independent rotational axes with two points of mutual intersection which are offset from each other. The mechanism has first and second housings, the first housing being adapted to be mounted to the arm of a robot to rotate independently. The second housing supports a tool support member and is capable of independent rotation relative to the first housing via gear trains. These two housings define therein a continuous unobstructed passage through which a flexible paint supply hose or a bundle of power supply wires is passed.

As will be described in more detail hereinafter with reference to the drawing, this prior art construction has a structure which makes it difficult to provide a relatively large opening through the housings for passing therein a flexible hose or a bundle of wires from the outside. In the case of spray painting, such opening is useful for reducing the distance between a spray gun and a color changeover valve. If the flexible paint hose can be led through such opening into the wrist mechanism housing to be coupled to the spray gun mounted on the distal end of the wrist mechanism, it will be possible to mount the color changeover valve in the neighborhood of the wrist mechanism so that the distance from the color changeover valve to the spray gun may be reduced. On the other hand, if a relatively large opening cannot be provided in the housing, it will not be possible to lead the hose into the wrist mechanism so that the hose will have to be passed through a relatively long robot arm and then into and through the wrist mechanism. This means that the color changeover valve will have to be mounted at a proximal end of the robot arm so that there will be a considerable increase of the distance between the color changeover valve and the spray gun. This increase in the distance is not desirable because the length of the hose extending from the color changeover valve increases so that whenever the paint color is changed the increased length of the hose will have to be rinsed or cleaned of the paint with resultant increased length of time required for cleaning.

Furthermore, as will be described later, the axes of rotation of the robot arm and the spray gun are offset due to the structure of the wrist mechanism, a cylindrical dead space is formed in which the spray coating cannot be performed reliably, as will be described in detail hereinafter. Moreover, in the state wherein the axes of the robot arm and the spray gun are maintained parallel with each other, it is not possible to displace the spray gun toward the axis of the robot arm while maintaining the attitude of the spray gun, as will be described in detail hereinafter.

SUMMARY OF THE INVENTION

It is an object of this invention to provide a wrist mechanism of a robot, capable of being provided with a relatively large opening therethrough so as to enable an elongated member such as a paint supply hose to be inserted thereinto to provide a shortened length of the elongated member.

A further object of the invention is to provide a wrist mechanism of a robot, in which a work tool held by the wrist mechanism can be moved to any position with any desired attitude.

According to this invention, there is provided a wrist mechanism adapted to be mounted on an arm of a robot, comprising: a first cylinder forming a coaxial extension of the arm and being rotatable about a longitudinal axis of rotation constituting a first wrist axis; a second cylinder disposed coaxially within the first cylinder so as to be rotatable about the first wrist axis relative to the first cylinder; a first gear secured to one end of the second cylinder so as to be rotatable about the first wrist axis; a power transmission shaft having an axis of rotation parallel to the first wrist axis and supported rotatably by the first cylinder; a second gear secured to one end of the power transmission shaft and meshing with the first gear; a first bevel gear secured to the other end of the power transmission shaft; a second bevel gear meshing with the first bevel gear, the second bevel gear being rotatably supported by the first cylinder to be rotatable about a second wrist axis intersecting the first wrist axis; and a cylindrical member fixed to the second bevel gear for swinging movement about the second wrist axis.

Preferred embodiments of this invention will be described below with reference to the accompanying drawings.

DESCRIPTION OF THE PREFERRED EMBODIMENTS

Before describing preferred embodiments of this invention, the prior art wrist mechanism referred to before will be described in more detail for a better understanding of the problems encountered in the prior art wrist mechanism.

Figure 9:
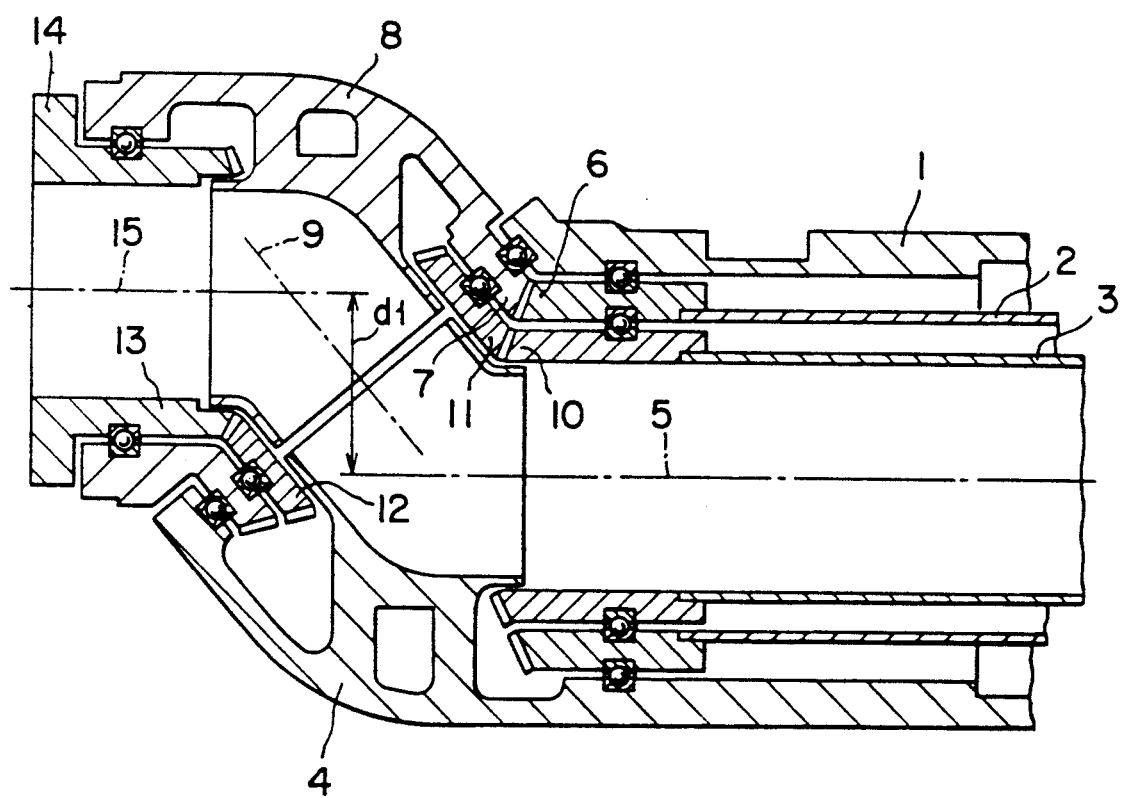
FIG. 9 is a longitudinal sectional view showing a prior art wrist mechanism.

Referring to FIG. 9, the wrist mechanism has an arm which comprises an outermost first cylinder 1, an intermediate second cylinder 2 and an innermost third cylinder 3 which are arranged concentrically and rotatably around their axis for performing a painting or coating operation. The left hand (as viewed) end of the first cylinder 1 is integrally formed with a first wrist housing 4 which is rotatable about an axis 5 together with the first cylinder 1. At the left hand (as viewed) end of the second cylinder 2 is secured a cylindrical first bevel gear 6 which meshes with a second bevel gear 7 secured to a second wrist housing 8 and supported by the first wrist housing 4 to be rotatable about a second axis 9 of the housing 4. A cylindrical bevel gear 10 is secured to the left hand end (as viewed) of the third cylinder 3 to mesh with a bevel gear 11. Another bevel gear 12 secured to the bevel gear 11 meshes with a bevel gear 13 which is formed integrally with a wrist flange 14 rotatably supported by the second wrist housing 8. The wrist flange 14 is rotatable about a third axis 15. The axes 5 and 15 are offset by a distance d1, so that a flexible hose, not shown, which passes a paint material therethrough and extends through the third cylinder 3 can be bent, and the entire wrist mechanism takes a bent form while allowing smooth rotation about the axes 5, 9 and 15. A paint spray gun, not shown, is coupled to the flange 14, and the flexible hose is connected to the spray gun.

With the prior art construction shown in FIG. 9, because of the provision of the bevel gears, it is difficult to form a relatively large opening through the housings 4 and 8, adapted to pass the flexible hose from the outside. As a consequence, even if it is desired that, for example, a paint changeover valve or color changeover valve be mounted on the first cylinder 1 for reducing the distance between the spray gun and the changeover valve, with the aim to shortening the rinsing time of the flexible hose at the time of changing the paint material, the flexible hose connected to the spray gun cannot be inserted into the housings 4 and 8. For this reason, in the construction shown in FIG. 9, the flexible hose must be mounted on and along the outer surfaces of the housings 4 and 8 and the first cylinder 1. In such a case, the flexible hose often contacts the workpieces, that is, the articles under spray coating. Furthermore, the spray material which has adhered to the flexible hose and has dried will tend to be peeled off from the flexible hose and drop onto the workpieces, thus degrading the quality of the same.

To eliminate these problems, the flexible hose will have to be inserted through the housings 4 and 8 and through the entire length of the third cylinder 3 for the connection to the color changeover valve mounted near the right hand (as viewed) end of the third cylinder 3. With this construction, the distance between the spray gun and the color changeover valve will necessarily become long so that when the spray material is changed to another material, a relatively long time will be required for rinsing the flexible hose. As a result, the time required for changing the spray material will increase.

Figure 10:
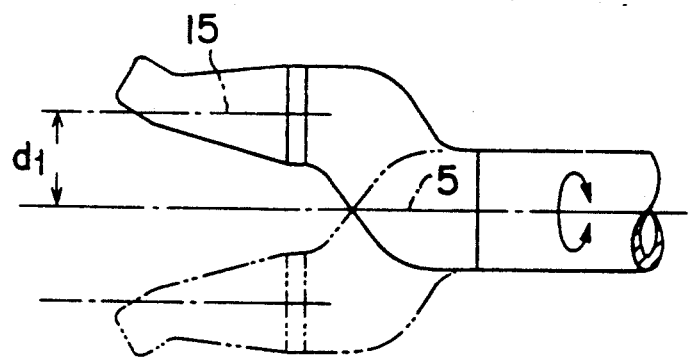
FIGS. 10 through 12 are schematic views explanatory of the operation of the prior art wrist mechanism.
Figure 11:
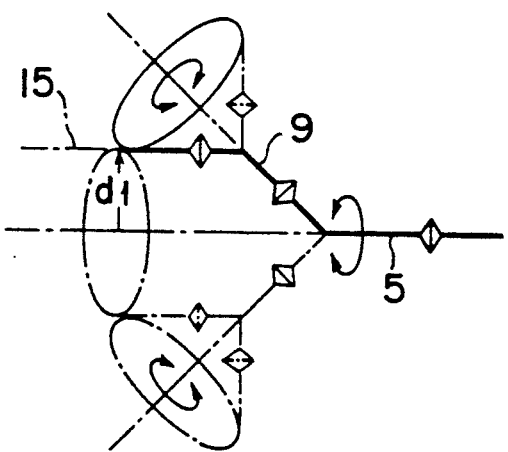

In the prior art mechanism shown in FIG. 9, when the spray gun connected to the wrist flange 14 is rotated about the axis of rotation 5 as shown in FIG. 10, it is not possible to spray-coat a cylindrical region which is a dead space having a radius d1 because the axes of rotation 5 and 15 are offset by d1 as above described. Moreover, even if the spray gun is rotated about the second axis 9 while being rotated about the axis 5 as indicated in FIG. 11, a dead space of a radius $d_1$ is also formed.

Figure 12:
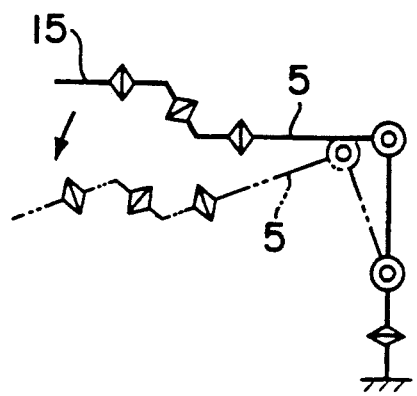

Furthermore, with this construction, where the axes of rotation 5 and 15 are maintained parallel with each other, it is impossible to move the spray gun toward the axis of rotation 5 while maintaining the attitude of the gun, as will be understood from FIG. 12.

These problems in the prior art wrist mechanism can be eliminated according to the embodiments of the invention which will be described below.

Figure 1:
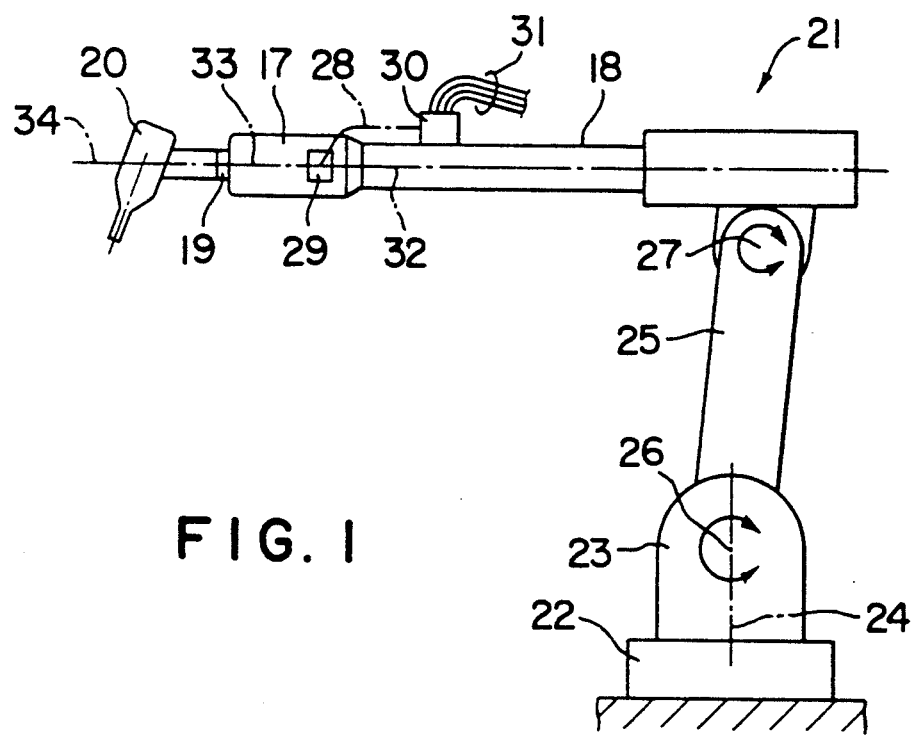
FIG. 1 is a schematic elevation of an industrial robot with a wrist mechanism according to this invention.
Figure 3:
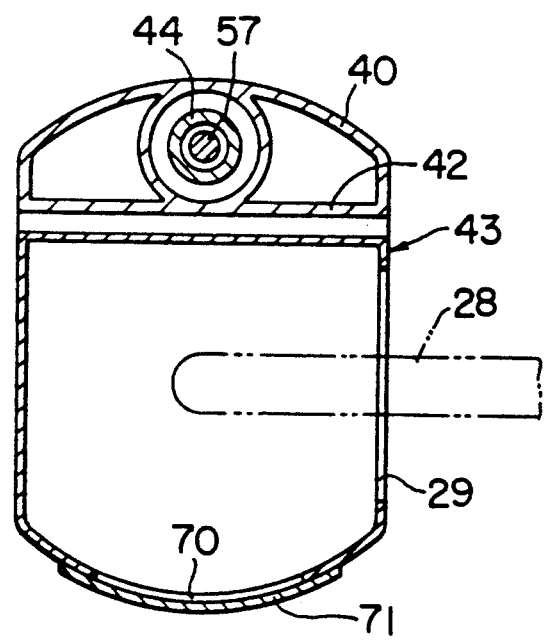
FIG. 3 is a cross-sectional view taken along line III—III in FIG. 2.

Referring to FIG. 1, there is shown an industrial robot generally designated 21 and shown as a robot for spray painting. A swivel support 23 on a base 22 of the robot 21 is rotatable about a vertical first axis 24, while a lower arm 25 provided on the swivel support 23 is swingable to the left and right about a horizontal second axis 26. An upper arm 18 is vertically swingable about a horizontal third axis 27 at the free end of the lower arm 25. The upper arm 18 carries a wrist mechanism 17 on the distal end thereof.

A single flexible hose 28 for feeding a paint material for coating to a spray gun 20 is inserted into an opening 29 formed through the wrist mechanism 17 and then connected to the spray gun 20. The gun 20 is mounted to a wrist flange 19 of the wrist mechanism 17. The flange 19 is for mounting a work tool such as the spray gun 20. The flexible hose 28 is connected to a color changeover valve 30 mounted on the upper arm 18 in the neighborhood of the wrist mechanism 17. To the changeover valve 30 are supplied paint materials of different colors, and by the operation of the changeover valve 30, one of the paint materials supplied through several flexible pipes 31 is selected and then fed to the flexible hose 28. Since the hose 28 is passed through the wrist mechanism 17 to be connected to the spray gun 20, it will not engage or interfere with workpieces to be coated. Furthermore, different from a construction in which the flexible hose 28 is exposed on the outside of the wrist mechanism 17, there is no problem of paint material adhering to and being dried on the workpiece, whereby degrading of the quality of the coated workpieces is prevented. In addition, it is possible to insert the flexible hose 28 through the opening 29 into the wrist mechanism 17, so that it is not necessary to attach the flexible hose 28 over the outer surface of the entire length of the upper arm 18 having a relatively large length. Therefore, it is possible to mount the color changeover valve 30 on the upper arm 18 adjacent the wrist mechanism 17. This construction serves to reduce the length of the flexible hose 28 connecting the spray gun 20 and the changeover valve 30 so that it becomes possible to reduce the time required for rinsing the flexible hose 28 at the time of changing the color, thereby reducing the time required for the change of the color of the paint. In the embodiment shown, although the changeover valve 30 is secured near the mechanism 17, the valve 30 can be mounted on the proximal end of the robot arm so as to pass the flexible hose 28 through the upper arm 18 from the rear end of the arm 18. However, for shortening the paint material changing time, the construction shown in FIG. 1 is advantageous.

Figure 2:
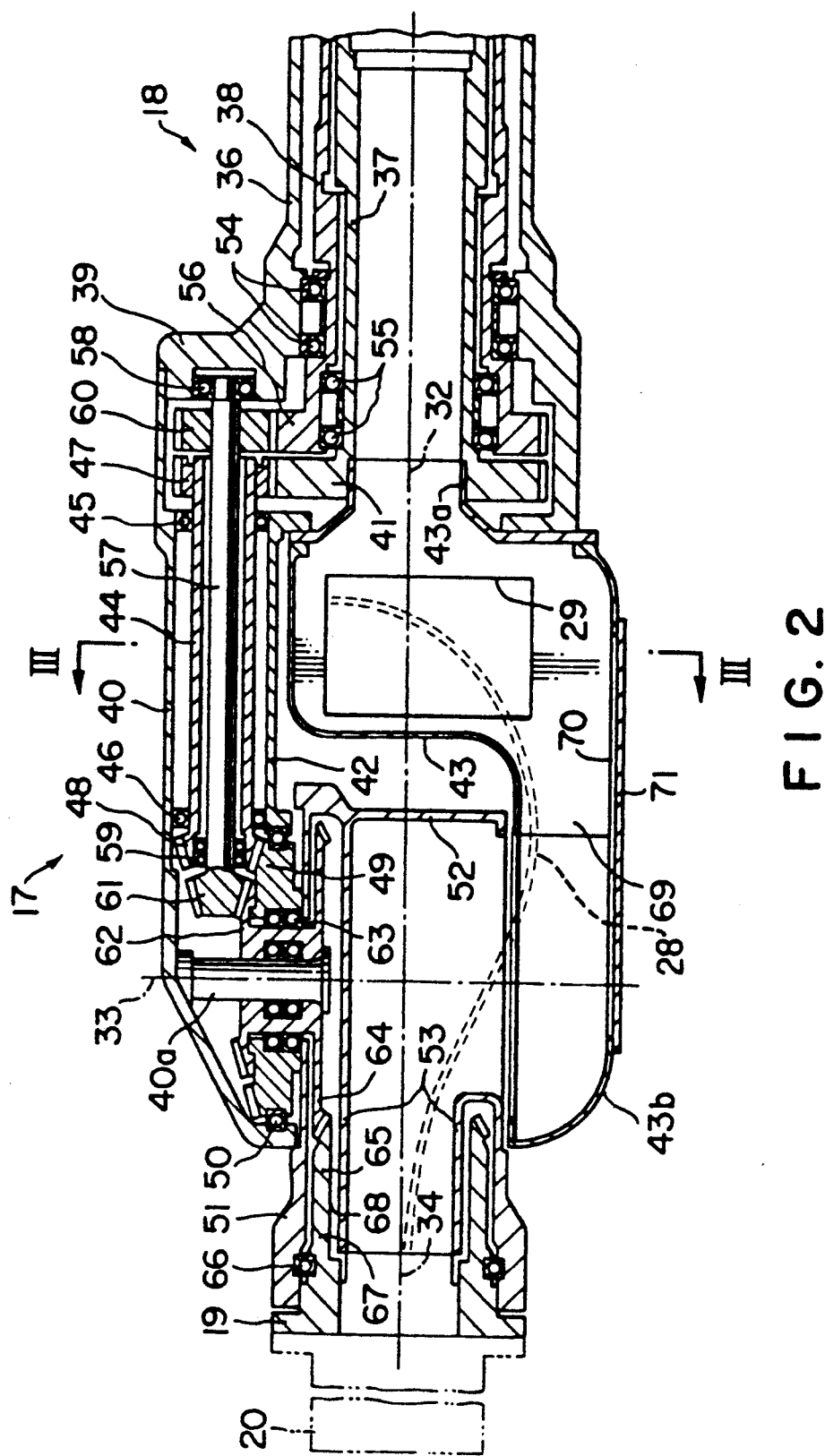
FIG. 2 is a longitudinal sectional view of the wrist mechanism shown in FIG. 1.

As shown in FIG. 2, the wrist mechanism 17 has an axis of rotation (first wrist axis) 32 coaxial with the axis of the upper arm 18, an axis of rotation (second wrist axis) 33 normal to the rotational axis 32, and an axis of rotation (third wrist axis) 34 on the extension of the rotational axis 32. As above described, the first and second wrist axes 32 and 33 are perpendicular to each other, and the third wrist axis 34 lies in a plane which contains the first wrist axis 32 and is normal to the second wrist axis 33. Therefore it is possible to perform the coating operation while maintaining the spray gun 20 in any desired attitude, as will be understood from an explanation to be made hereinafter.

As shown in FIG. 2, the upper arm 18 is of a triple pipe construction, and the wrist mechanism 17 connected to this upper arm 18 comprises a first cylinder 36, a second cylinder 37 concentrically disposed in the first cylinder 36 so as to be rotatable with respect to the first cylinder 36, and a third cylinder 38 concentrically inserted between the first and second cylinders 36 and 37 so as to be able to relatively rotate. An enlarged supporting member 39 is integrally secured to the end of the first cylinder 36, and a housing 40 is secured to the supporting member 39 so as to extend away from the cylinder 36. To the end of the second cylinder 37 is coaxially secured a spur gear 41, that is, a first gear.

Figure 4:
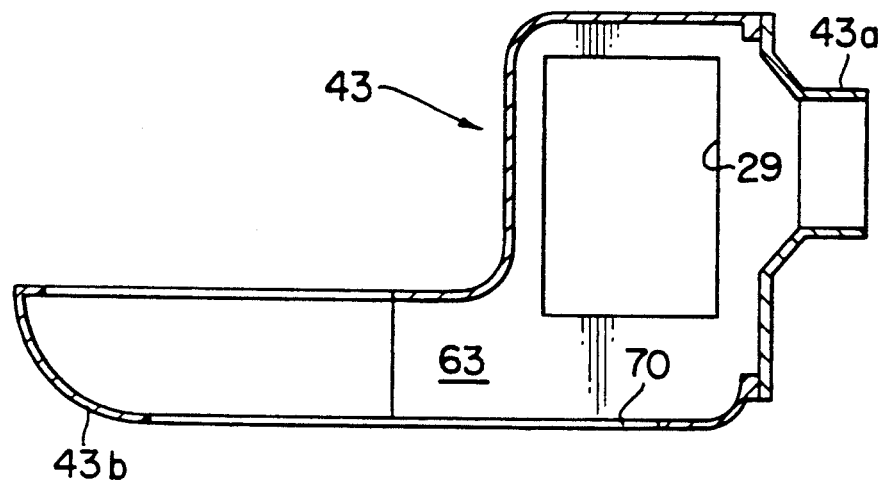
FIG. 4 is a sectional view of a cover used in the wrist mechanism of FIG. 2.

Inside the housing 40 is mounted a cover 43 having a hollow overall shape shown in FIG. 4. The cover 43 has a cross-sectional configuration shown in FIG. 4 and is formed with the opening 29 through a side wall thereof. The cover 43 has at one end thereof a cylindrical portion 43a which is fixedly fitted into the second cylinder 37 as shown in FIG. 2. As shown in FIG. 4, the interior space 63 of the cover 43 extends downward and sidewise to define a bent passage therein. At the other end, the cover 43 has an extension 43b which opens upwardly. A service opening 70 is formed through the bottom of the cover 43.

A hollow power transmission shaft 44 is rotatably supported by the housing 40 via bearings 45 and 46 as shown in FIG. 2. In other words, the hollow shaft 44 is rotatably supported indirectly by the first cylinder 36. The hollow power transmission shaft 44 has a rotational axis parallel to the axis of the first cylinder 36. A second spur gear 47 meshing with the first spur gear 41 is secured to one end of the hollow shaft 44. To the other end of the hollow shaft 44 is secured a first bevel gear 48 meshing with a second bevel gear 49. This second bevel gear 49 is supported to be rotatable about the second wrist axis 33 which intersects perpendicularly with the first wrist axis 36. The second bevel gear 49 is supported via a bearing 50 by the housing 40 and hence supported indirectly by the first cylinder 36.

Figure 5:
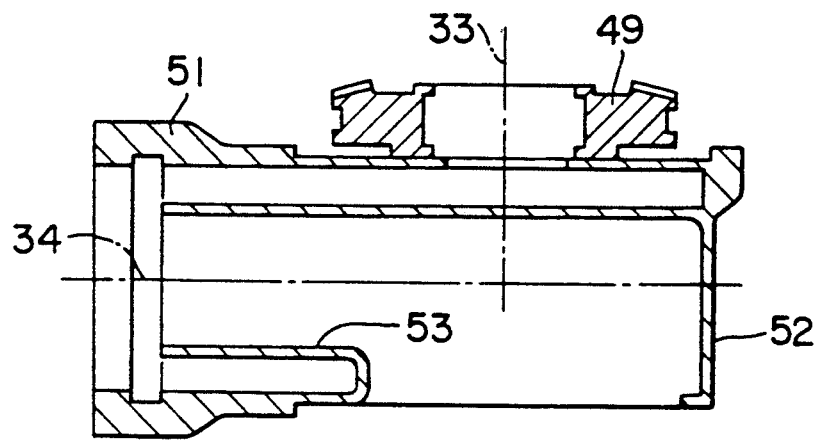
FIG. 5 is a sectional view of a cylindrical member used in the wrist mechanism of FIG. 2.

A cylindrical member 51 is secured to the second bevel gear 49 as indicated in FIG. 5. The cylindrical member 51 is concentric with the third wrist axis 34 and has a coaxial inner cylindrical wall 53 formed integrally therewith. The interior space of the cylindrical wall 53 opens downward (as viewed) and communicates with the space above (as viewed) the extension 43b of the cover 43. A depending partition wall 52 forms an axial end wall of the interior space. It will be understood that when the second bevel gear 49 is rotated about the second wrist axis 33, the cylindrical member 51 will make an angular movement about the axis 33.

The intermediate third cylinder 38 is rotatably supported by the supporting member 39 via a bearing 54, and a bearing 55 is provided between the third cylinder 38 and the second cylinder 37. A spur gear 56 which is parallel to the first spur gear 41 is secured to one end of the third cylinder 38. A solid power transmission shaft 57 is supported at one end thereof by the supporting member 39 through a bearing 58, and supported at the other end thereof by the hollow shaft 44 via a bearing 59. As above described, the solid power transmission shaft 57 extends through the hollow shaft 44 to be supported thereby to rotate freely. To the one end of the solid power transmission shaft 57 is secured a spur gear 60, that is, a fourth spur gear, which meshes with the third spur gear 56. A third bevel gear 61 is secured to the other end of the solid power transmission shaft 57. A fourth bevel gear 62 meshing with the third bevel gear 61 is rotatably supported by a shaft 40a fixed to the housing 40. The fourth bevel gear 62 is rotatably and coaxially fitted within the second bevel gear 49 through a bearing 63, that is, the fourth bevel gear 62 is supported by the housing 40 and hence by the first cylinder 36.

A fifth bevel gear 64 is integrally secured to the fourth bevel gear 62. The fifth bevel gear 64 meshes with a sixth cylindrical bevel gear 65. This sixth bevel gear 65 is rotatably supported by the cylindrical member 51 via a bearing 66. The sixth bevel gear 65 has an axis lying in a plane normal to the second wrist axis 33 and including the first wrist axis 32. The sixth bevel gear 65 has a central bore 68 and an integral supporting sleeve 67 terminating at the wrist flange 19.

In operation, when the second cylinder 37 is rotated by a power source, the rotation will be transmitted via the spur gears 41 and 47, the hollow power transmission shaft 44 and the bevel gear 48 to the bevel gear 49, whereby the cylindrical member 51 and hence the spray gun 20 will be caused to swing about the second wrist axis 33. When the third cylinder 38 is rotated by the power source, the rotation will be transmitted via the spur gears 56 and 60, the solid power transmission shaft 57, and the bevel gears 61, 62 and 64 to the cylindrical bevel gear 65, whereby the supporting sleeve 67 and hence the spray gun 20 will be rotated about the third wrist axis 34.

Figure 6:
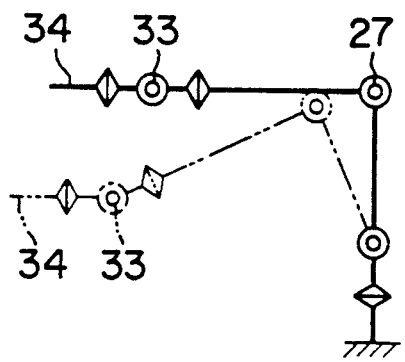
FIGS. 6 and 7 are schematic views for explaining the operation of the wrist mechanism.

It will be understood from the foregoing and from a study of FIG. 6 that the spray gun 20 can be displaced vertically without changing its horizontal attitude, that is, while maintaining the third wrist axis 34 horizontal, by swinging the upper arm 18 in the vertical direction and/or by swinging the lower arm 25 forward and rearward.

Figure 7:
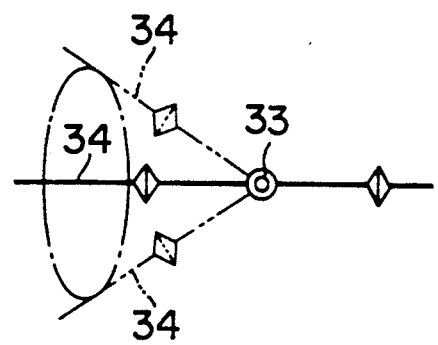

FIG. 7 shows that the spray gun 20 secured to the supporting sleeve 67 is allowed to swing about the second wrist axis 33 so that a dead space to which the spray gun cannot have access is not formed.

Figure 8:
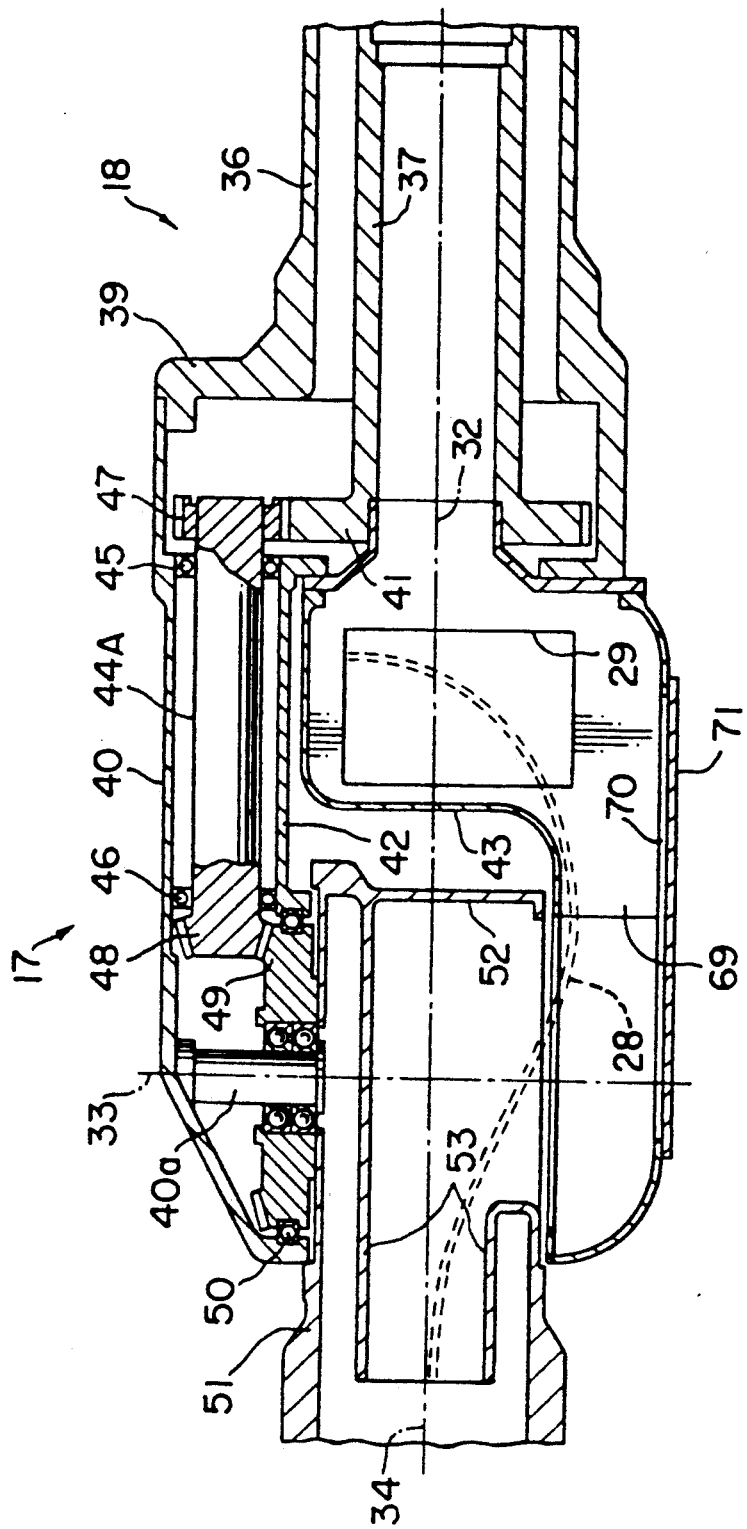
FIG. 8 is a view similar to FIG. 2 but showing a modified wrist mechanism according to this invention.

The flexible hose 28 can be inserted into the interior space 69 of the cover 43 through the opening 29. The inserted hose 28 is passed in bent shape due to the shape of the cover 43 and the partition wall 52. The hose 28 extends from within the cylindrical wall 53 to the spray gun 20 secured to the wrist flange 19, via the sleeve 67. Since the flexible hose 28 is permitted to bend in the space 69 due to the cover 43 and the partition wall 52, the supporting sleeve 67 can easily rotate about the rotational axes 33 and 34. The service opening 70 is closed or opened by a cover 71. When the cover 71 is removed, it is possible to inspect and maintain the flexible hose 28 inserted into the space 69. According to this embodiment, an advantage is obtained in that relatively large openings 29 and 70 can be formed through the cover 43. FIGS. 2 and 8 show, in phantom, an example of a configuration of flexible hose 28. Other configurations will certainly be contemplated by those skilled in the art, and the invention is not meant to be limited thereto.

It should be understood that the application of this invention is not limited to a coating robot, and that the invention is also applicable to other various types of industrial robot performing various operations. The flexible hose 28 can be replaced by other flexible elongated member such as an electric cable.

In another embodiment of this invention shown in FIG. 8, the third cylinder 38, the solid power transmission shaft 57, the third and fourth spur gears 56 and 60, the third to sixth bevel gears 61, 62, 64, 65 and the sleeve 67 shown in FIG. 2 are omitted. In this embodiment the hollow power transmission cylinder shaft 44 is made solid as shown at 44A instead of being made hollow.

As above described, according to this invention, a second cylinder concentrically extends in a first cylinder having a longitudinal rotational axis which is a first wrist axis, and the driving power from a first spur gear secured to one end of the second cylinder is transmitted to a first bevel gear via a second spur gear and a power transmission shaft, whereby a second bevel gear is rotated about a second wrist axis which intersects the first wrist axis so that it is not only possible to insert the flexible hose from the proximal end of the upper robot arm but also possible to insert the flexible hose into the wrist mechanism in the vicinity of the one end of the second cylinder, which makes it easy to contain an elongated member within the wrist mechanism.

Furthermore, according to this invention a third cylinder may be concentrically interposed between the first and second cylinders, and the power transmission shaft may be made hollow to allow another power transmission shaft to extend therethrough so as to transmit the operating power from the third cylinder to third to fifth bevel gears via a third spur gear, a fourth spur gear and the other power transmission shaft.

What is claimed is:

1. A wrist mechanism adapted to be mounted on an arm of a robot, comprising:
    a first cylinder forming a coaxial extension of said arm and being rotatable about a longitudinal axis of rotation constituting a first wrist axis;
    a second cylinder disposed coaxially within said first cylinder so as to be rotatable about said first wrist axis relative to said first cylinder;
    a first gear secured to one end of said second cylinder so as to be rotatable about said first wrist axis;
    a power transmission shaft having an axis of rotation parallel to said first wrist axis and rotatable relative to said first cylinder;
    a second gear secured to one end of said power transmission shaft and meshing with said first gear;
    a first bevel gear secured to the other end of said power transmission shaft;
    a second bevel gear meshing with said first bevel gear, said second bevel gear being rotatable relative to said first cylinder about a second wrist axis intersecting said first wrist axis; and
    a cylinder member fixed to said second bevel gear for swinging movement about said second wrist axis.

2. The wrist mechanism according to claim 1, wherein said first and second gears are spur gears.

3. The wrist mechanism according to claim 1, further comprising:
    an enlarged supporting member integral with said first cylinder;
    a housing fixedly secured to an end of the enlarged supporting member and extending away from the first cylinder so as to enclose said first and second gears, said power transmission shaft, and said first and second bevel gears.

4. The wrist mechanism according to claim 3, further comprising:
    a cover projecting transversely to said housing so as to define beside the housing a bent passage for passing a flexible elongated member through the wrist mechanism.

5. The wrist mechanism according to claim 3, wherein said cover has an opening through which a flexible elongated member can be led into the wrist mechanism.

6. The wrist mechanism according to claim 5, wherein said cover has a service opening openably closed by a cover.

7. The wrist mechanism according to claim 3, wherein said cylindrical member is located at a position remote from said first cylinder and extends away from the first cylinder with a third wrist axis.

8. The wrist mechanism according to claim 1, further comprising:
    a third cylinder interposed between said first and second cylinders in concentric relation thereto so as to be rotatable relative to the first and second cylinders;
    a third gear secured to one end of said third cylinder so as to be rotatable about said first wrist axis;
    a second power transmission shaft having an axis of rotation parallel to said first wrist axis and supported rotatably by said first cylinder;
    a fourth gear secured to one end of said second power transmission shaft and meshing with said third gear;
    a third bevel gear secured to the other end of said second power transmission shaft;
    a fourth bevel gear meshing with said third bevel gear, said fourth bevel gear being rotatable relative to said first cylinder to be rotatable about said second wrist axis;
    a fifth bevel gear rotatable with said fourth bevel gear;
    a sixth bevel gear meshing with said fifth bevel gear and rotatably supported to be rotatable about a third wrist axis; and
    mounting means integral with the sixth bevel gear, for mounting a work tool.

9. The wrist mechanism according to claim 8, further comprising:
    an enlarged supporting member integral with said first cylinder;
    a housing fixedly secured to an end of the enlarged supporting member and extending away from the first cylinder so as to enclose said first, second, third and fourth gears, said two power transmission shafts, said first, second, third, fourth, fifth and second bevel gears.

10. The wrist mechanism according to claim 8, wherein said first, second, third and fourth gears are spur gears.

11. The wrist mechanism according to claim 8, wherein said cylindrical member is located at a position remote from said first cylinder and extends away from the first cylinder with a third wrist axis and wherein said sixth bevel gear is connected to said mounting means through a sleeve which is coaxially supported in said cylindrical member in a manner rotatable relative to the cylindrical member.

12. The wrist mechanism according to claim 11, wherein said cylindrical member has a coaxial inner cylindrical wall formed integral therewith, and a cover projects transversely to said housing, said inner cylindrical wall and said cover defining therethrough a bent passage for passing a flexible elongated member through the wrist mechanism.

13. The wrist mechanism according to claim 8, wherein said first mentioned power transmission shaft is a hollow shaft and the second power transmission shaft extends coaxially in the first mentioned transmission shaft.

* * * * *